United States Patent
Bouron et al.

(10) Patent No.: US 8,845,204 B2
(45) Date of Patent: Sep. 30, 2014

(54) SPACER FOR ROLLING BEARING WITH LOW FRICTION CONTRIBUTION

(71) Applicant: Aktiebolaget SKF, Göteborg (SE)

(72) Inventors: Cyril Bouron, Avallon (FR); Jean-Baptiste Magny, Migé (FR); Pascal Ovize, Chitry le Fort (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/766,919

(22) Filed: Feb. 14, 2013

(65) Prior Publication Data

US 2013/0216173 A1    Aug. 22, 2013

(30) Foreign Application Priority Data

Feb. 16, 2012 (EP) .................................... 12305175

(51) Int. Cl.
| | |
|---|---|
| *F16C 33/37* | (2006.01) |
| *F16C 33/48* | (2006.01) |
| *F16C 33/46* | (2006.01) |
| *F16C 33/51* | (2006.01) |
| *F16C 19/30* | (2006.01) |

(52) U.S. Cl.
CPC ................ *F16C 33/46* (2013.01); *F16C 33/48* (2013.01); *F16C 2300/14* (2013.01); *F16C 33/513* (2013.01); *F16C 33/4605* (2013.01); *F16C 19/30* (2013.01); *F16C 2352/00* (2013.01); *F16C 33/3706* (2013.01)
USPC ........................................................ 384/623

(58) Field of Classification Search
CPC .... F16C 33/37; F16C 33/3706; F16C 33/513; F16C 19/30; F16C 19/305
USPC ...................... 384/623, 44, 618–622
See application file for complete search history.

(56) References Cited

U.S. PATENT DOCUMENTS

| | | | | |
|---|---|---|---|---|
| 3,847,456 | A * | 11/1974 | Schwarzbich | ................ 384/620 |
| 3,938,866 | A * | 2/1976 | Martin | ......................... 384/623 |
| 4,413,866 | A | 11/1983 | Geisey | |
| 4,861,171 | A | 8/1989 | Adachi | |
| 6,779,923 | B2 * | 8/2004 | Murata | ........................... 384/44 |

FOREIGN PATENT DOCUMENTS

| | | |
|---|---|---|
| DE | 7935977 U1 | 4/1980 |
| DE | 3245332 A1 | 6/1984 |
| DE | 3620102 A1 | 12/1987 |
| FR | 2222898 A5 | 10/1974 |
| FR | 2600132 A1 | 12/1987 |
| GB | 1469841 A | 4/1977 |
| JP | 63123824 U | 8/1988 |
| JP | 2004205029 A | 7/2004 |

* cited by examiner

*Primary Examiner* — Thomas R Hannon
(74) *Attorney, Agent, or Firm* — Bryan Peckjian; SKF USA Inc. Patent Department

(57) ABSTRACT

The spacer is adapted for a rolling bearing comprising an inner ring, an outer ring and at least one row of contact rollers disposed between raceways and guiding surfaces provided on the rings. The spacer comprises opposite inner and outer portions facing one another and at least a first lateral portion extending transversally between the inner and outer portions and connected to the portions. The inner and outer portions and the first lateral portion delimit at least partly a pocket configured to receive at least a contact roller. The inner and outer portions each comprise at least a protruding means extending outwards and having a contact surface with one of the inner and outer rings.

23 Claims, 5 Drawing Sheets

SPACER FOR ROLLING BEARING WITH LOW FRICTION CONTRIBUTION

CROSS-REFERENCE TO RELATED APPLICATION

This application claims priority to European Patent Application No. EP12305175 filed on Feb. 16, 2012, the contents of which are fully incorporated herein by reference.

FIELD OF THE INVENTION

The present invention relates to the field of rolling bearings, in particular rolling bearings having an inner ring, an outer ring, and one or more rows of contact rollers therebetween. The invention relates more particularly to the field of large-diameter rolling bearings, notably those used in a tunnel boring machine.

BACKGROUND OF THE INVENTION

A large-diameter rolling bearing comprises generally two concentric inner and outer rings, at least a row of contact rollers arranged between raceways and guiding faces provided on the rings, and a plurality of spacers disposed circumferentially between the rollers. Such rolling bearings are generally loaded, both axially and radially, often with a relatively strong load.

French patent FR 2 222 898 relates to apertured spacers for rolling bearing which, by being assembled together, form a cage for the rollers. Each apertured spacer is of a substantially rectangular shape with inner and outer portions and lateral portions extending transversally between the inner and outer portions. Each spacer is provided with a recess retaining the associated roller introduced by force through one aperture, the width of the aperture being less than the diameter of the roller.

The inner and outer portions of each spacer may respectively come into contact with the guiding faces of the rings. Such contacts between the spacers and the rings induce an increase of the friction torque of the rolling bearing.

It is a particular object of the present invention to provide a spacer for rolling bearing adapted to reduce its friction contribution and which is simple to manufacture and economic.

SUMMARY OF THE INVENTION

In one embodiment, the spacer for rolling bearing comprising an inner ring, an outer ring and at least one row of contact rollers disposed between raceways provided on the rings, includes opposite inner and outer portions facing one another and at least a first lateral portion extending transversally between the inner and outer portions and connected to the portions. The inner and outer portions and the first lateral portion delimit at least partly a pocket configured to receive at least a contact roller. The inner and outer portions each comprise a contact surface with an end face of the roller. The inner and outer portions each comprise at least a protruding means extending outwards and having a contact surface with one of the inner and outer rings.

In one embodiment, each protruding means extends outwards from an outer surface of the inner or outer portion directed towards the guiding surface of the corresponding ring. The inner and outer portions may each comprise two spaced protruding means extending transversally on the corresponding outer surface.

Alternatively or in combination, each protruding means may extend outwards from a longitudinal edge of the inner or outer portion directed towards the raceway of the corresponding ring.

In one embodiment, the protruding means have in cross-section a profile in the shape of an arc of circle.

Advantageously, the first lateral portion comprises an inner surface forming a bearing surface for an exterior rolling surface of the at least roller.

In one embodiment, the spacer further comprises a second lateral portion facing the first lateral portion and extending from the outer portion towards the inner portion, the inner and outer portions delimiting together with the lateral portions the pocket configured to receive at least two superposed contact rollers. A free edge of the second lateral portion defines advantageously with the inner portion an aperture. The second lateral portion may comprise an inner surface forming a bearing surface for at least an exterior rolling surface of one of the rollers.

In one embodiment, the pocket is laterally open on the side opposite to the first lateral portion.

The inner and outer portions and the first lateral portion may have in cross-section the overall shape of a C.

Advantageously, the spacer is formed in one part from metal or from polymer material.

In another aspect of the invention, a rolling bearing comprises an inner ring, an outer ring, at least one row of contact rollers disposed between raceways and guiding surfaces provided on the rings, and a plurality of spacers as previously defined and disposed circumferentially between the rollers.

The rolling bearing as previously defined may be particularly useful as a bearing for a tunnel boring machine.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
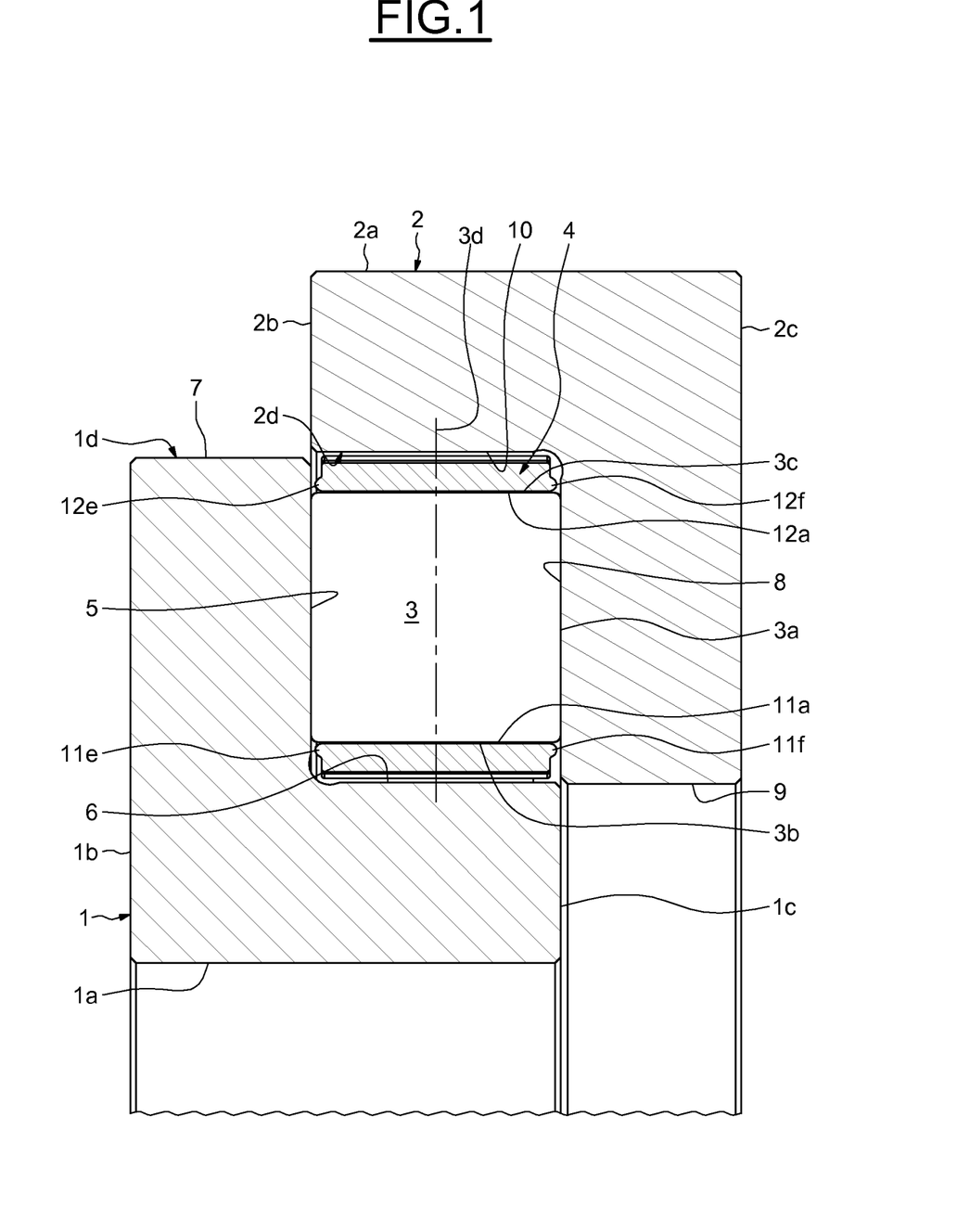
FIG. 1 is a half section of a rolling bearing according to a first example of the invention.

The rolling bearing as illustrated on the FIG. 1 is a large-diameter rolling bearing comprising an inner ring 1 and an outer ring 2 between which is housed one row of contact rollers 3. The rolling bearing also comprises a plurality of spacers 4 disposed circumferentially between the rollers 3 to maintain their circumferential spacing.

The inner and outer rings 1, 2 are concentric and extend axially along the bearing rotation axis (not shown) of the rolling bearing. The rings 1, 2 are of the solid type. A "solid ring" is to be understood as a ring obtained by machining with removal of material (by machining, grinding) from metal tube stock, bar stock, rough forgings and/or rolled blanks.

The rollers 3 are identical with one another and each comprise an exterior rolling surface 3a and opposite end transverse faces 3b, 3c delimiting axially the rolling surface. In the illustrated embodiment, the rolling surface 3a of each roller has a cylindrical profile. Alternatively, the rolling surfaces may have a spherical profile or a logarithmic profile. In the illustrated embodiment, the angle between the rotation axis 3d of each roller and the bearing axis is equal to 90°. The rotation axis 3d of each roller extends radially.

The inner ring 1 has a bore 1a of cylindrical shape designed to be fixed to a chassis or to a structure of machine (not shown) and delimited by opposite radial lateral surfaces 1b, 1c. The inner ring 1 also comprises a stepped exterior cylindrical surface 1d onto which an annular radial raceway 5 is formed. The raceway 5 has in cross-section a straight internal profile in contact with the rolling surfaces 3a of the rollers 3. The raceway 5 is formed by the radial surface provided between a first axial surface 6 of small-diameter and a second axial surface 7 of large-diameter of the stepped exterior cylindrical surface 1d. As will be described later, the axial surface 6 forms an annular guiding surface which may be in radial contact with the spacers 4. The axial guiding surface 6 is straight, disposed perpendicular to the raceway 5 and connected to the edge of small-diameter of the raceway by an annular concave fillet. The guiding surface 6 extends axially from the edge and is connected to the radial surface 1c of the inner ring. The guiding surface 6 and the raceway 5 of the inner ring delimit an annular groove.

The outer ring 2 comprises an outer cylindrical surface 2a delimited by opposite radial lateral surfaces 2b, 2c. The outer ring 2 also comprises a stepped annular bore 2d of cylindrical shape into which an annular radial raceway 8 is formed. The raceway 8 has in cross-section a straight internal profile in contact with the rolling surfaces 3a of the rollers 3. The raceway 5 of the inner ring and the raceway 8 of the outer ring axially face each other and are parallel. The raceway 8 is formed by the radial surface provided between a first axial surface 9 of small-diameter and a second axial surface 10 of large-diameter of the stepped bore 2d. As will be described later, the axial surface 10 forms an annular guiding surface which may be in radial contact with the spacers 4. The guiding surface 10 of the outer ring and the guiding surface 6 of the inner ring radially face each other and are parallel. The guiding surface 10 is straight, disposed perpendicular to the raceway 8 and connected to the edge of large-diameter of the raceway by an annular concave fillet. The guiding surface 10 extends axially from the edge and is connected to the radial surface 2b of the outer ring. The guiding surface 10 and the raceway 8 of the outer ring delimit an annular groove.

The raceway 5 and the guiding surface 6 of the inner ring define together with the raceway 8 and the guiding surface 10 of the outer ring an annular space inside which the rollers 3 and the spacers 4 are disposed. Each roller 3 arranged between the raceways 5, 8 is maintained by the associated spacer 4 which may bear against the guiding surfaces 6, 10 and the raceways 5, 8.

The spacers 4 are identical with one another and each placed between two consecutive rollers 3. The spacers 4 may be made in one part from metal or bronze. Alternatively, the spacers 4 may be made from polymer material such as polyamide, for instance by molding.

Figures 2, 3, 4:
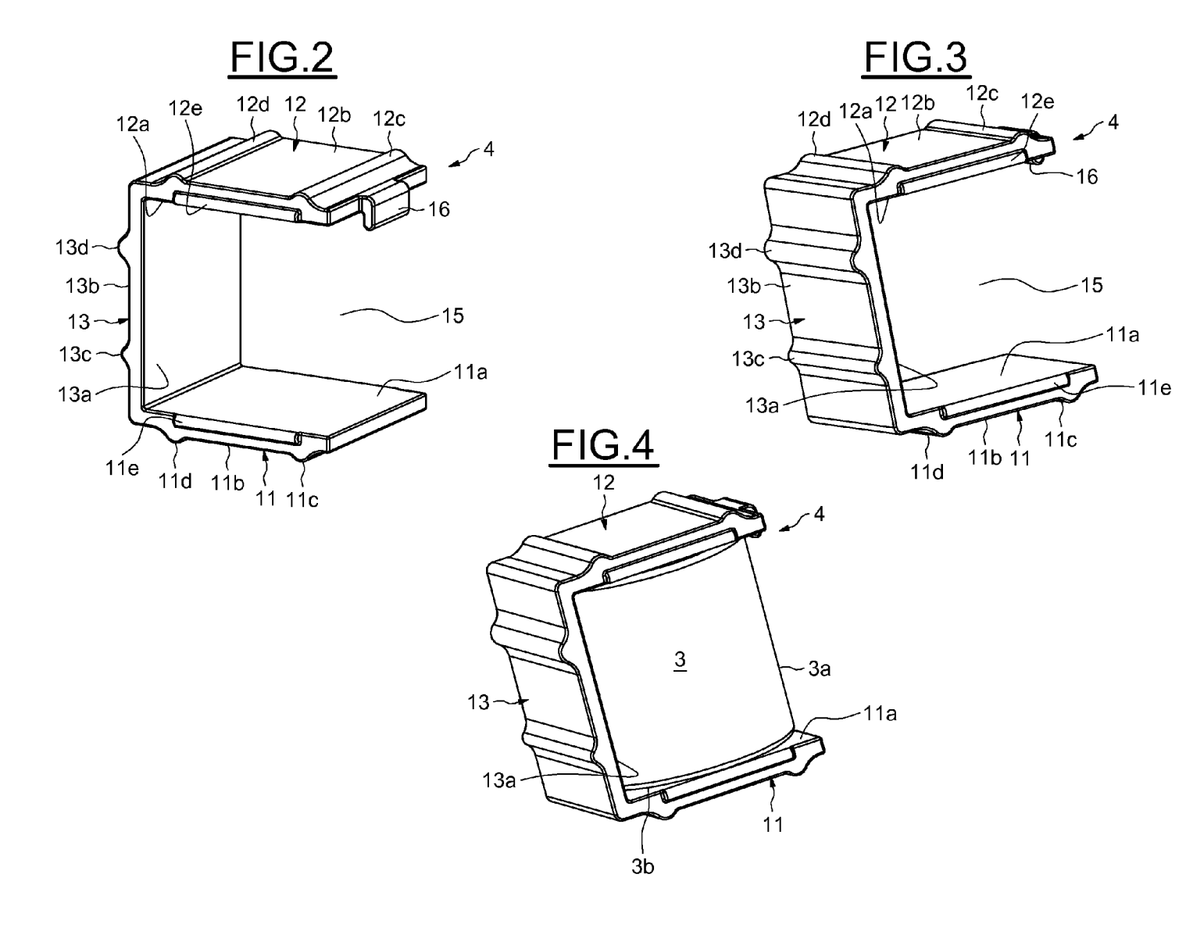
FIGS. 2 and 3 are perspective views of a spacer of the rolling bearing of FIG. 1.
FIG. 4 is a perspective view of the spacer of FIGS. 2 and 3 with its associated roller.

As shown on FIGS. 2 to 4, each spacer 4 comprises two parallel inner and outer portions 11, 12 adapted to come into contact with the facing guiding surfaces and the raceways of the inner and outer rings, and a lateral portion 13 extending transversally between the opposite portions 11, 12 and adapted to be located circumferentially between two adjacent rollers 3. The lateral portion 13 is connected to a lateral edge of the inner portion 11 and to the opposite facing edge of the outer portion 12. The inner and outer portions 11, 12 and the lateral portion 13 each have a rectangular shape with similar width, length and thickness. The width of the portions 11, 12 and 13 is slightly smaller than the radius of the roller 3.

As shown on FIG. 1, the raceways 5, 8 and the guiding surface 6, 10 of the inner and outer rings each form a flank having a direct contact surface with the inner and outer parts 11, 12 of each spacer to have a slight relative sliding between each spacer 4 and the rings 1, 2. In order to limit the induced friction torque of the spacers 4, slight axial clearances are foreseen between each spacer and the raceways 5, 8 of the rings and slight radial clearances are foreseen between each spacer and the guiding surface 6, 10.

Referring once again to FIGS. 2 to 4, the inner and outer portions 11, 12 and the lateral portion 13 of each spacer have in cross-section the overall shape of a C and delimit a pocket 15 for receiving one roller 3. On the side opposite to the lateral portion 13, the spacer 4 is deprived of lateral portion extending transversally between the inner and outer portions and connected to the portions. The spacer 4 is deprived of lateral portion symmetric to the lateral portion 13. The pocket 15 is laterally open on the side opposite to the lateral portion 13 between the inner and outer portions 11, 12. In the mounted position of the spacer 4 into the rolling bearing, the pocket 15 is delimited in the circumferential direction only by the lateral portion 13 and is delimited in the radial direction by the inner and outer portions 11, 12. In this mounted position, the pocket 15 of one spacer 4 is circumferentially open towards the adjacent spacer 4. The pocket 15 of each spacer 4 is open both axially in the two directions and circumferentially in one direction. The pocket 15 is open on three sides.

With regard to the rotation axis 3d of the associated roller 3, the inner and outer portions 11, 12 extend radially, the lateral portion 13 extends axially between the portions and the pocket 15 is radially open toward the outside. On the side opposite to the lateral portion 13, an opening or aperture is delimited axially by the free edges of the inner and outer portions 11, 12 and extends axially between these portions in order to open laterally the pocket 15.

The inner and outer portions 11, 12 of each spacer have inner planar contact surfaces 11a, 12a facing each other and forming bearing surfaces for the end faces 3b, 3c of the associated roller. The gap between the planar contact surfaces 11a, 12a is substantially equal to the length of the roller 3. The lateral portion 13 comprises an inner planar contact surface 13a forming a bearing surface for the rolling surface 3a of the associated roller.

The spacer 4 further comprises a hook 16 which slightly protrudes inwards toward the inner portion 11 from the free edge of the outer portion 12. The hook 16 is disposed on the outer portion 12 on the side opposite to the lateral portion 13. The hook 16 comprises an inner planar contact surface forming a bearing surface for the rolling surface 3a of the associated roller. The hook 16 is adapted to interfere with the roller 3 in order to avoid an escape from the open pocket 15. In the mounted position of the spacer 4 into the rolling bearing, the inner and outer portions 11, 12 maintain the roller 3 in the radial direction, and the lateral portion 13 and the hook 16 maintain the roller 3 in the circumferential direction. The hook 16 forms a circumferential retaining means for the roller 3.

The inner portion 11 of each spacer also comprises a planar outer surface 11b and two spaced guiding ribs 11c, 11d provided on the outer surface. The guiding ribs 11c, 11d protrude outwards relative to the outer surface 11b and extend transversally on the outer surface from a longitudinal edge of the inner portion 11 to an opposite longitudinal edge. The opposite longitudinal edges delimit the outer surface 11b. In the disclosed embodiment, the guiding ribs 11c, 11d are identical to one another and have in cross-section a profile in the shape of an arc of circle. Here, the rib 11c is located near to the free edge of the inner portion 11 while the rib 11d is located near to the edge of the inner portion 11 linked to the lateral portion 13.

In the mounted position of the spacer 4 into the rolling bearing, the planar outer surface 11b of the inner portion 11 faces the guiding surface 6 of the inner ring while remaining distant from the latter, and the guiding ribs 11c, 11d may come into contact with the guiding surface 6. With the protruding guiding ribs 11c and 11d, the friction contacts between the inner part 11 of each spacer and the associated guiding surface 6 of the inner ring are reduced. Besides, there is a linear contact between each guiding rib 11c, 11d and the guiding surface 6. With such a contact, there is less friction between each spacer 4 and the inner ring 1.

The inner portion 11 of each spacer further comprises two lateral guiding flanges 11e, 11f each providing on one of the longitudinal edges of the inner portion. Each guiding flange 11e, 11f protrudes outwards from the associated longitudinal edge. In the disclosed embodiment, the guiding flanges 11e, 11f are identical to one another, extend longitudinally between the ribs 11c, 11d and have in cross-section a profile in the shape of an arc of circle.

In the mounted position of the spacer 4 into the rolling bearing, the lateral guiding flange 11e axially faces the raceway 5 of the inner ring while the other lateral guiding flange 11f axially faces the raceway 8 of the outer ring. If an axial contact appears between the spacer 4 and the inner or outer ring, with the protruding guiding flanges 11e and 11f, the friction contacts between the inner portion 11 of each spacer and the raceway 5 or 8 are reduced. Besides, the contact between each guiding flange 11e, 11f and the associated raceway 5, 8 is linear. With such a contact, there is less friction between each spacer 4 and the inner and outer rings 1, 2.

Since the inner and outer portions 11, 12 of each spacer are similar in the illustrated embodiment, only one of them is described here in detail, it being understood that the references "a, b, c, d, e and f" previously used for the inner part 11 are also used for the identical elements of the outer part 12. Similarly to the inner portion 11 of the spacer with regard to the guiding surface 6 of the inner ring, with the protruding guiding ribs 12c, 12d of the outer portion, the friction contacts between the outer part 12 of each spacer and the associated guiding surface 10 of the outer ring are reduced. Besides, there is a linear contact between each guiding rib 12c, 12d and the guiding surface 10.

The lateral portion 13 of each spacer comprises a planar outer surface 13b and two spaced guiding ribs 13c, 13d provided on the outer surface. The guiding ribs 13c, 13d protrude outwards relative to the outer surface 13b and extend transversally on the outer surface from a longitudinal edge of the lateral portion 13 to an opposite longitudinal edge. The opposite longitudinal edges delimit the outer surface 13b. The ribs 13c, 13d have in cross-section a profile in the shape of an arc of circle. In the disclosed embodiment, the ribs 13c, 13d have different thicknesses in order to be used for rolling bearings having different diameters. The rib 13c having the smaller thickness is located near to the edge of the lateral portion 13 linked to the inner portion 11 while the rib 13d is located near to the edge of the lateral portion 13 linked to the outer portion 12.

Figure 5:
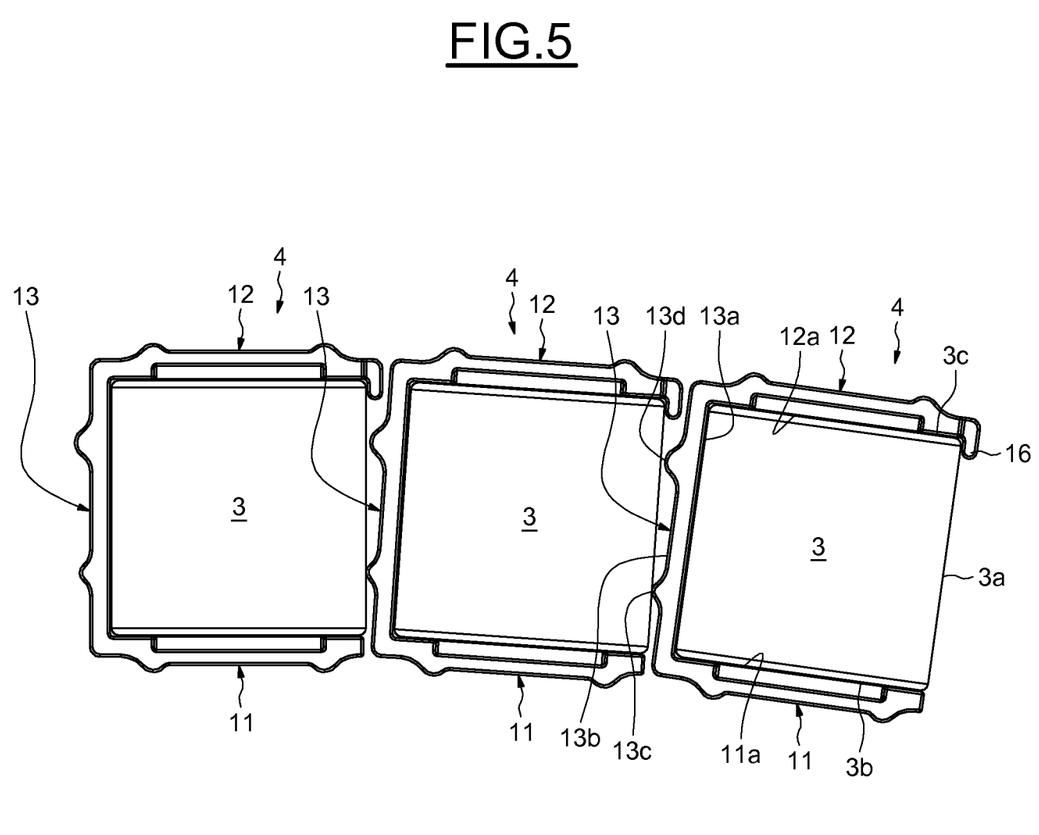
FIG. 5 is a side view showing three spacers and the associated rollers as mounted in the rolling bearing.

In the mounted position of the spacers 4 into the rolling bearing as shown on FIG. 5, the guiding rib 13c of one spacer 4 bears against the rolling surface 3a of the roller 3 which is housed into adjacent spacer 4 since the pocket of the spacer is laterally open towards the lateral portion 13 of the other spacer. There is a direct contact between the guiding rib 13c of the lateral portion of one spacer and the adjacent roller 3 supported by the successive spacer 4 in the circumferential direction. In the mounted position, there is only one lateral portion 13 disposed circumferentially between two successive rollers 3. The pocket 15 of each spacer enables to reduce the circumferential space between two successive rollers 3. Accordingly, the number of rollers 3 disposed between the inner and outer rings 1 and 2 may be increased. This leads to higher load bearing capacity of the rolling bearing as well as an increase of the service life.

In the mounted position of the spacers 4, when the roller 3 of one spacer 4 rotates around its axis, the rib 13c of the adjacent spacer which comes into contact with the rolling surface 3a of the roller act as a guiding means for the roller. Each roller 3 is maintained radially by the inner and outer portions 11, 12 of the associated spacer 4 and circumferentially by the lateral portion 13 of the spacer 4, the retaining hook 16 and the guiding rib 13c of the adjacent spacer 4. With the protruding guiding rib 13c, the friction contacts between the roller 3 disposed into the pocket of one spacer and the lateral portion 13 of the adjacent spacer 4 are reduced. Besides, there is a linear contact between these elements. With such a contact, there is less friction.

During use, the inner and outer portions 11, 12 of each spacer 4 disposed axially between the raceways 5, 8 of the inner and outer rings may come respectively into contact with the guiding surfaces 6, 10 of the rings to guide the spacer and the associated roller 3 while the guiding rib 13c of the spacer bears against the roller 3 which is housed into the adjacent spacer. When the guiding ribs 11c, 11d or 12c, 12d of the spacer come into contact with the associated guiding surface of the rings, both the spacer 4 and its associated roller 3 may slightly pivot around one of the guiding ribs in contact with the guiding surface in order to follow the path of the raceways 5, 8 of the rings. Such a rotation is also made possible with the contact of the guiding rib 13c with the adjacent roller 3. The spacer 4 and the associated roller 3 may also pivot around the guiding rib 13c. Accordingly, the sliding of the rollers 3 along the raceways 5, 8 of the rings is enhanced and the stress level on each spacer 4 is reduced. Otherwise, the guiding ribs 11c, 11d, 12c, 12d of each spacer enable to avoid a high skewing or tilting of the rollers 3.

In the disclosed embodiment, only the lower rib 13c of each spacer comes into contact with the rolling surface 3a of the adjacent roller 3. In case of a rolling bearing having a larger diameter and using the same rollers 3 and spacers 4, both the lower rib 13c and the upper rib 13d of each spacer or only the upper rib 13d may come into contact with the adjacent roller.

Figures 6, 7, 8:
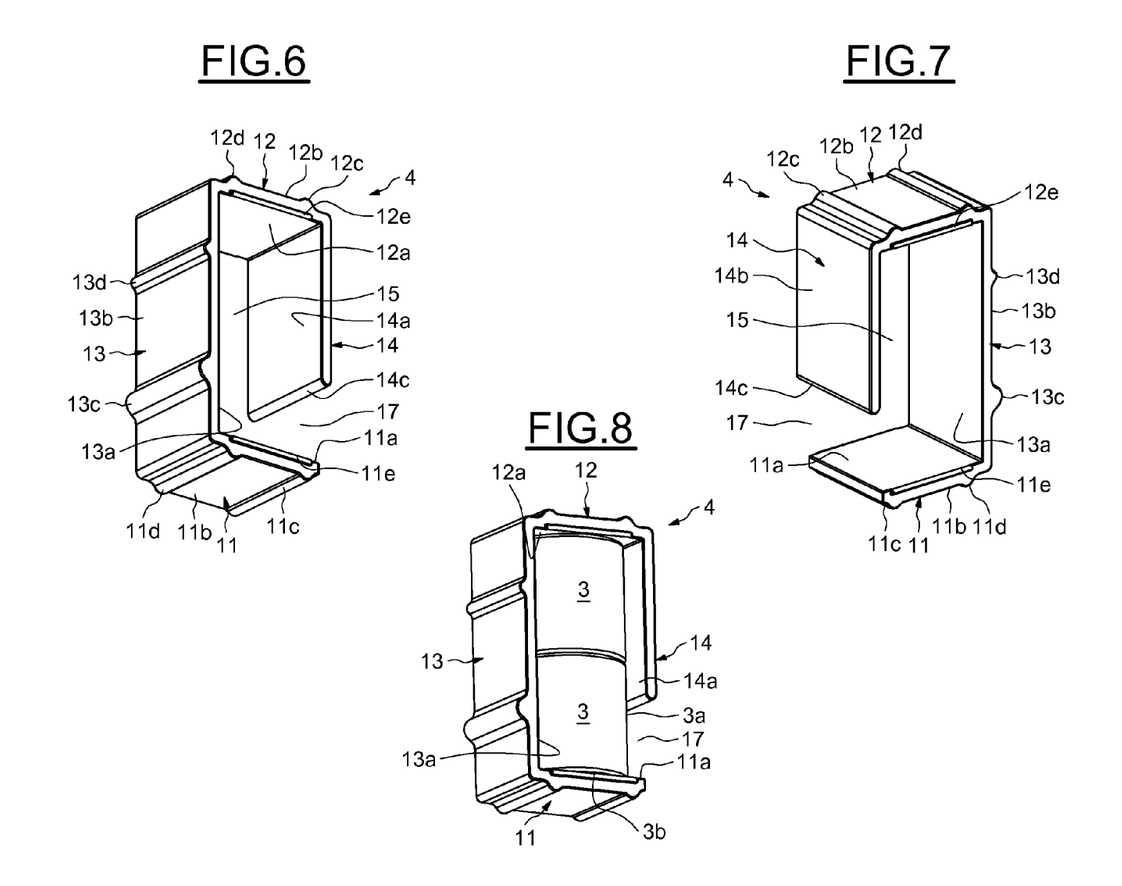
FIGS. 6 and 7 are perspective views of a spacer according to a second example of the invention.
FIG. 8 is a perspective view of the spacer of FIGS. 6 and 7 with its associated rollers.

In the embodiment illustrated on FIGS. 6 to 8, in which identical parts are given identical references, the spacer 4 is adapted to maintain a pair of two superposed rollers 3. The two associated rollers 3 are mounted axially in contact to one another with regard to their common rotation axis. The upper end face of the lower roller 3 bears against the lower end face of the upper roller 3. Such a spacer 4 is adapted for a rolling bearing defining an annular space inside which two rows of contact rollers 3 which lie on different radii are disposed. In such a rolling bearing, each spacer 4 is disposed between two consecutive pairs of stacked rollers 3.

In this embodiment, the gap between the planar contact surfaces 11a, 12a is substantially equal to twice the length of one roller 3. Each spacer 4 further comprises a second lateral portion 14 extending transversally from the outer portion 12 towards the inner portion 11 and facing the first lateral portion 13. The first and second lateral portions 13, 14 are parallel to one another. The second lateral portion 14 extends from the edge of the outer portion 12 located on the side opposite to the first lateral portion 13. The lateral portion 14 extends towards the inner portion 11 while remaining distant from the latter. The inner and outer portions 11, 12 and the lateral portions 13, 14 each have a rectangular shape with similar width and thickness. The width of the inner and outer portions 11, 12 and the lateral portions 13, 14 is slightly smaller than the radius of the rollers 3.

The inner and outer portions 11, 12 and the opposite first and second lateral portions 13, 14 delimit the pocket 15 for receiving two superimposed rollers 3. An opening or aperture 17 is defined between the second lateral portion 14 and the inner portion 11. The pocket 15 is laterally open on the side opposite to the first lateral portion 13 between the inner portion 11 and the second lateral portion 14. In the mounted position of the spacer 4 into the rolling bearing, the pocket 15 is delimited in the circumferential direction by the first and second lateral portions 13, 14 and is delimited in the radial direction by the inner and outer portions 11, 12. In this mounted position, the pocket 15 of one spacer 4 is circumferentially open towards the adjacent spacer 4 with the aperture 17. The pocket 15 of each spacer 4 is open both axially in the two directions and circumferentially in one direction. The pocket 15 is open on three sides. With regard to the common rotation axis 3d of the superposed rollers 3 held into the pocket 15 of each spacer, the inner and outer portions 11, 12 extend radially, the first and second lateral portions 13, 14 extend axially between the portions and the pocket 15 is radially open toward the outside. The aperture 17 is delimited axially by the inner portion 11 and the lateral portion 14.

The second lateral portion 14 of each spacer comprises an inner planar contact surface 14a facing the contact surface 13a of the lateral portion 13 and forming a bearing surface for the upper and lower rollers 3. In the disclosed embodiment, the lateral portion 14 has a length greater than the length of the upper roller 3 in order to extend beyond the zone of contact between the upper roller 3 and the lower roller. Accordingly, the inner contact surface 14a also forms a bearing surface for the rolling surface 3a of the lower roller 3. The lateral portion 14 recovers the entire length of the upper roller 3 and recovers partly the lower roller 3. The lateral portion 14 is adapted to interfere with the lower roller 3 in order to avoid an escape from the open pocket 15. In the mounted position of the spacer 4 into the rolling bearing, the inner and outer portions 11, 12 maintain the upper and lower superposed rollers 3 in the radial direction, and the lateral portions 13, 14 maintain the rollers 3 in the circumferential direction.

The lateral portion 14 of each spacer also comprises a planar outer surface 14b facing the lateral portion 13 of the adjacent spacer in the mounted position into the rolling bearing as will be described later. A free end 14c of the lateral portion 14 defines with the free edge of the inner portion 11 the aperture 17 to open laterally the pocket 15 on the side opposite to the first lateral portion 13. The free edge 14c of the second lateral portion 14 remains distant from the inner portion 11 to delimit the aperture 17. The length of the aperture 17 is smaller than the length of one roller 3.

Figure 9:
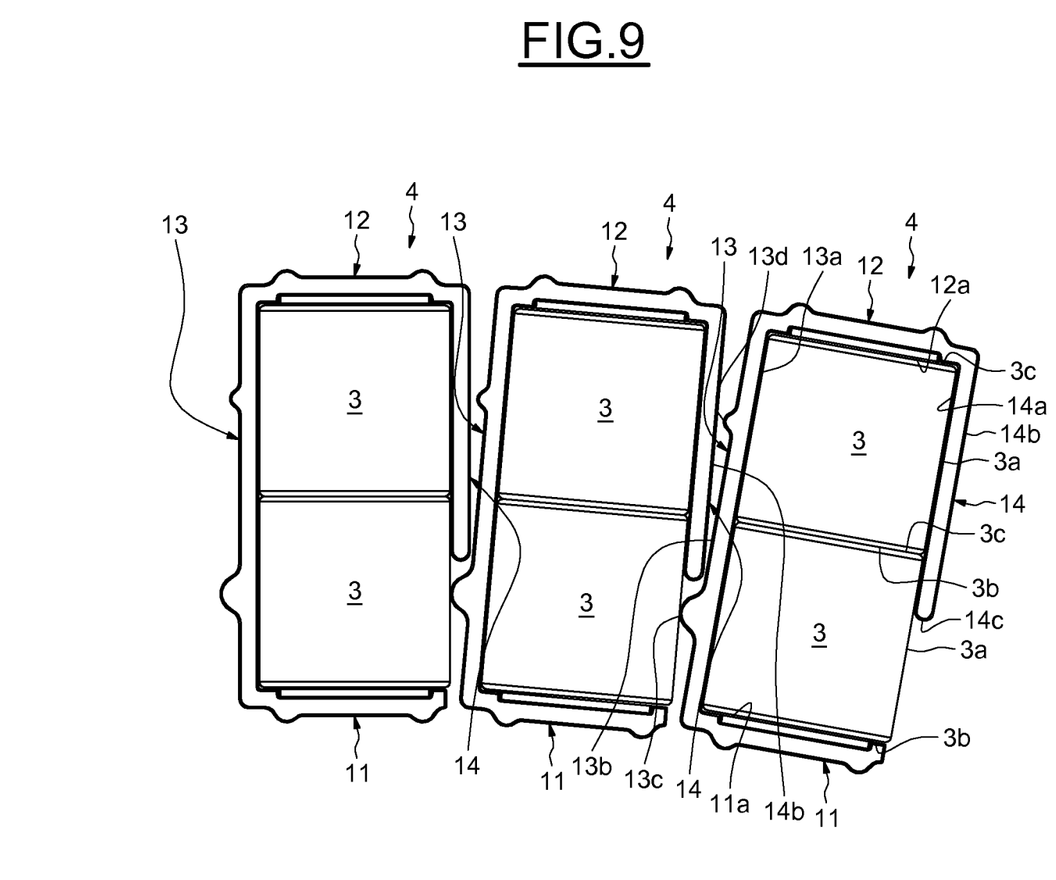
FIG. 9 is a side view showing three spacers and the associated rollers as shown on FIG. 8 and as mounted in a rolling bearing.

In the mounted position of the spacers 4 into the rolling bearing as shown on FIG. 9, the guiding rib 13c of one spacer 4 protrudes through the aperture 17 of the adjacent spacer 4 since the pocket of the spacer is laterally open towards the lateral portion 13 of the considered spacer. The guiding rib 13c extends into the aperture 17 and bears against the rolling surface 3a of the lower roller 3 which is housed into the adjacent spacer 4. There is a direct contact between the guiding rib 13c of the lateral portion of one spacer and the adjacent lower roller 3 supported by the successive spacer 4 in the circumferential direction. In the mounted position, the pocket 15 of each spacer enables to reduce the circumferential space between two successive lower rollers 3. Accordingly, the number of rollers 3 disposed between the inner and outer rings 1 and 2 may be increased. This leads to higher load bearing capacity of the rolling bearing as well as an increase of the service life.

In the disclosed embodiment, only the lower rib 13c of each spacer comes into contact with the rolling surface 3a of the adjacent lower roller 3, the guiding rib 13d facing the outer surface 14b of the lateral portion 14 of the adjacent spacer which remaining distant from the latter. In case of a rolling bearing having a larger diameter and using the same rollers 3 and spacers 4, the lower rib 13c of each spacer may come into contact with the adjacent lower roller 3 and the upper rib 13d may come into contact with the outer surface 14b of the lateral portion of the adjacent spacer 4. Alternatively, only the upper rib 13d of each spacer may come into contact with the outer surface 14b of the lateral portion of the adjacent spacer 4 and the lower rib 13c may remain distant from the rolling surface 3a of the adjacent lower roller 3.

The general structure of each spacer 4 is lightened by the provision of a pocket 15 defined by three or four portions or lugs and open in the circumferential direction towards the outside on the side opposite to the lateral portion 13. A weight reduction for each spacer 4 is thus obtained. In another embodiment, the spacer may be not open in the circumferential direction towards the outside and may have a second lateral portion connected to the inner portion. The friction contribution of each spacer 4 with regard to the inner and outer rings 1, 2 is reduced by the presence of the ribs 11c to 11f and the ribs 12c to 12f. Similarly, the friction contribution of each spacer 4 with the roller located into the adjacent spacer is also reduced by the presence of the ribs 13a, 13b. The ribs 11c to 11f, 12c to 12f, 13c and 13d of each spacer 4 also improve the guiding of the rollers 3 along the raceways 5, 8 of the rings.

Although the invention has been illustrated on the basis of a rolling bearing having a single row of contact rollers or a double row of superposed contact rollers, it should be understood that the invention can be applied to bearings having more rows of rollers. Otherwise, in the illustrated embodiment, the rolling bearing is adapted to accommodate axial loads. Alternatively, it may also be possible to have a rolling bearing adapted to accommodate radial loads or both axial and radial loads. Furthermore, the inner ring and/or the outer ring may comprise gearing teeth on their outer periphery, so as to be connected to driving gears for instance connected to the output shaft of a motor.

The invention claimed is:

1. A spacer for a rolling bearing, the rolling bearing including an inner ring, an outer ring and at least one row of contact rollers disposed between raceways and guiding surfaces provided on the rings, the spacer comprising:
    opposite inner and outer portions facing one another, at least a first lateral portion extending transversally between the inner and outer portions and connected to the portions, wherein the inner and outer portions and the first lateral portion at least partly delimit a pocket configured to receive at least a contact roller, wherein the inner and outer portions each having a contact surface with an end face of the roller, the inner and outer portions each comprising at least a protruding means extending outwards and having a contact surface with one of the inner and outer rings, and wherein the pocket is laterally open on the side opposite to the first lateral portion.

2. The spacer according to claim 1, wherein each protruding means extends outwards from an outer surface of the inner or outer portion directed towards the guiding surface of the corresponding ring.

3. The spacer according to claim 2, wherein the inner and outer portions each comprise two spaced protruding means extending transversally on the corresponding outer surface.

4. The spacer according to claim 1, wherein each protruding means extends outwards from a longitudinal edge of the inner or outer portion directed towards the raceway of the corresponding ring.

5. The spacer according to claim 1, wherein the protruding means have in cross-section a profile in the shape of an arc of circle.

6. The spacer according to claim 1, wherein the first lateral portion further comprises an inner surface forming a bearing surface for an exterior rolling surface of the at least roller.

7. The spacer according to claim 1, further comprising a second lateral portion facing the first lateral portion and extending from the outer portion towards the inner portion, the inner and outer portions delimiting together with the lateral portions the pocket configured to receive at least two superposed contact rollers.

8. The spacer according to claim 7, wherein a free edge of the second lateral portion defines with the inner portion an aperture.

9. The spacer according to claim 7, wherein the second lateral portion further comprises an inner surface forming a bearing surface for at least an exterior rolling surface of one of the rollers.

10. The spacer according to claim 1, wherein the inner and outer portions and the first lateral portion have in cross-section the overall shape of a C.

11. The spacer according to claim 1, further comprising being formed in one part from metal or from a polymer material.

12. A rolling bearing comprising:
an inner ring,
an outer ring,
at least one row of contact rollers disposed between raceways and guiding surfaces provided on the rings, and
a plurality of spacers disposed circumferentially between the rollers, the plurality of spacers comprising:
opposite inner and outer portions facing one another,
at least a first lateral portion extending transversally between the inner and outer portions and connected to the portions, wherein
the inner and outer portions and the first lateral portion at least partly delimit a pocket configured to receive at least a contact roller, wherein
the inner and outer portions each having a contact surface with an end face of the roller, the inner and outer portions each comprising at least a protruding means extending outwards and having a contact surface with one of the inner and outer rings, and
wherein the pocket is laterally open on the side opposite to the first lateral portion.

13. A tunnel boring machine comprising: a rolling bearing according to claim 12.

14. A spacer for a rolling bearing, the rolling bearing including an inner ring, an outer ring and a plurality of roller elements disposed between the inner ring and the outer ring, the spacer comprising:
a first wall having an outer surface and an inner contact surface configured to contact at least one of the roller elements;
a second wall having an outer surface and an inner contact surface facing the inner contact surface of the first wall, the second wall inner contact surface being configured to contact the at least one of the roller elements; and
a third wall extending from the first wall to the second wall, wherein the first wall, the second wall and the third wall at least partly define a pocket configured to receive the at least one of the roller elements, the pocket being open on a side opposite the third wall, and
wherein the outer surface of the first wall includes at least one protrusion extending away from the second wall, the protrusion being configured to contact one of the inner and outer rings.

15. The spacer according to claim 14 wherein the outer surface of the second wall includes at least one protrusion extending away from the first wall, the at least one protrusion of the second wall being configured to contact one of the inner and outer rings.

16. The spacer according to claim 15 wherein the third wall has an outer surface facing away from the pocket, the outer surface of the third wall including at least one protrusion configured to contact a second one of the plurality of roller elements.

17. The spacer according to claim 14 including a fourth wall extending from the first wall toward the second wall, the fourth wall having a free end spaced from the second wall.

18. The spacer according to claim 14, wherein the spacer is C-shaped in cross section.

19. The spacer according to claim 14, wherein the at least one protrusion on the outer surface of the first wall comprises at least one rib having a profile in cross section in the shape of an arc of circle.

20. A spacer for a rolling bearing, the rolling bearing including an inner ring, an outer ring and a plurality of roller elements disposed between the inner ring and the outer ring, the spacer comprising:
a first wall having a first end and a second end and an outer surface having a rib protruding from the outer surface at a location spaced from the first wall first end and spaced from the first wall second end, and an inner contact surface configured to contact at least one of the roller elements;
a second wall having a first end and a second end and an outer surface having a rib protruding from the second wall outer surface at a location spaced from the second wall first end and spaced from the second wall second end and an inner contact surface facing the inner contact surface of the first wall, the second wall inner contact surface being configured to contact the at least one of the roller elements; and
a third wall extending from the first wall to the second wall, wherein the first wall, the second wall and the third wall at least partly define a pocket configured to receive the at least one of the roller elements, and wherein the rib on the outer surface of the first wall and the rib on the outer surface of the second wall are each configured to contact one of the inner and outer rings.

21. The spacer according to claim 20, further including a fourth wall extending from the first wall, the fourth wall being parallel to the third wall.

22. The spacer according to claim 20, wherein the rib on the outer surface of the first wall and the rib on the outer surface of the second wall each have in cross-section a profile in the shape of an arc of circle.

23. A rolling bearing comprising the spacer according to claim 20.

* * * * *